(12) United States Patent
Moeller et al.

(10) Patent No.: US 10,489,326 B2
(45) Date of Patent: Nov. 26, 2019

(54) DEVICE AND SYSTEM FOR AGGREGATING NETWORKS AND SERVING DATA FROM THOSE NETWORKS TO COMPUTERS

(71) Applicant: Road-IQ, LLC, Bellingham, WA (US)

(72) Inventors: Mark M. Moeller, Everson, WA (US); Lester Meeks, Lynden, WA (US); Rory N. McLeod, Lynden, WA (US); Collin J. Topolski, Bellingham, WA (US)

(73) Assignee: Road-IQ, LLC, Bellingham, WA (US)

( * ) Notice: Subject to any disclaimer, the term of this patent is extended or adjusted under 35 U.S.C. 154(b) by 0 days.

(21) Appl. No.: 15/969,304

(22) Filed: May 2, 2018

(65) Prior Publication Data

US 2018/0246831 A1 Aug. 30, 2018

Related U.S. Application Data

(63) Continuation of application No. 13/838,081, filed on Mar. 15, 2013, now abandoned.

(60) Provisional application No. 61/613,906, filed on Mar. 21, 2012.

(51) Int. Cl.
*G06F 13/38* (2006.01)
(52) U.S. Cl.
CPC .................. *G06F 13/385* (2013.01)
(58) Field of Classification Search
CPC .................................................. G06F 13/385
See application file for complete search history.

(56) References Cited

U.S. PATENT DOCUMENTS

| | | |
|---|---|---|
| 3,081,057 A | 3/1963 | Farnsworth |
| 3,482,811 A | 12/1969 | Zent |
| 3,729,163 A | 4/1973 | Cummins |
| 3,831,896 A | 8/1974 | Owens |
| 4,789,232 A | 12/1988 | Urbanek |
| 4,793,582 A | 12/1988 | Bronstein et al. |
| 5,433,417 A | 7/1995 | Schmidt et al. |
| 5,576,899 A | 11/1996 | Englander |
| 5,639,054 A | 6/1997 | Gerndt et al. |
| 6,012,819 A | 1/2000 | Pai |
| 6,017,126 A | 1/2000 | Matsuura et al. |
| 6,171,540 B1 | 1/2001 | Ibaragi |
| 7,036,945 B2 | 5/2006 | Sakata |
| 7,055,973 B2 | 6/2006 | Englander |
| 7,210,800 B2 | 5/2007 | Englander |
| 7,252,398 B2 | 8/2007 | Englander |

(Continued)

*Primary Examiner* — Idriss N Alrobaye
*Assistant Examiner* — Ronald T Modo
(74) *Attorney, Agent, or Firm* — Schiff Hardin LLP

(57) ABSTRACT

Disclosed herein, in one example, is a device for aggregating networks and serving data from those networks to computers for integrating information from various systems in a vehicle, processing that information, and presenting it to consumers of information in a suitable format. The device for aggregating networks, in another example, is specific to a vehicle and serving data from those networks to computers. The device, in one example, generally includes three main pieces: a motherboard containing the electronics embodying the vehicle computer system; software which implements the instructions for the electronics enabling the functionality disclosed herein; and, a case to protect the motherboard and provide a method of mounting the devices.

6 Claims, 4 Drawing Sheets

(56) References Cited

U.S. PATENT DOCUMENTS

| | | |
|---|---|---|
| 7,290,891 B2 | 11/2007 | Englander |
| 7,452,088 B2 | 11/2008 | Brester et al. |
| 7,490,945 B2 | 2/2009 | Proctor |
| 7,530,537 B2 | 5/2009 | Kandah |
| 7,717,576 B2 | 5/2010 | Englander |
| 2003/0115287 A1* | 6/2003 | Irfan .................. G06F 8/61 709/219 |
| 2003/0191563 A1* | 10/2003 | Eagleton ............ G05B 23/0229 701/33.4 |
| 2005/0242969 A1* | 11/2005 | Deutsch .................. B60Q 1/00 340/815.45 |
| 2008/0128565 A1 | 6/2008 | Kandah |
| 2008/0253006 A1 | 10/2008 | Englander |
| 2008/0265122 A1 | 10/2008 | Branham |
| 2011/0172871 A1* | 7/2011 | Hall ...................... B60W 50/14 701/31.4 |
| 2011/0209181 A1* | 8/2011 | Gupta .................... H04N 7/163 725/62 |
| 2012/0065815 A1* | 3/2012 | Hess ...................... B60K 37/00 701/2 |
| 2012/0132402 A1* | 5/2012 | Aoki .................. F28D 15/0266 165/104.21 |
| 2012/0207088 A1* | 8/2012 | Liu ...................... H04L 65/608 370/328 |
| 2012/0209634 A1* | 8/2012 | Ling ...................... G06Q 40/08 705/4 |

\* cited by examiner

DEVICE AND SYSTEM FOR AGGREGATING NETWORKS AND SERVING DATA FROM THOSE NETWORKS TO COMPUTERS

RELATED APPLICATIONS

This application is a continuation patent application of U.S. patent application Ser. No. 13/838,081, filed Mar. 15, 2013, which is incorporated herein by reference in its entirety.

This application claims priority benefit of U.S. Provisional Patent Application Ser. No. 61/613,906, filed Mar. 21, 2012, which is incorporated herein by reference in its entirety.

BACKGROUND OF THE DISCLOSURE

Field of the Disclosure

This disclosure, in one example, relates generally to in-vehicle computer systems. More specifically, the disclosure relates to a device for aggregating networks in a vehicle and serving data from those networks to computers for integrating information from various systems in a vehicle, processing that information, and presenting it to consumers of information in a suitable format. In another example, the system is utilized in other environments beyond vehicles, such as in medical instrumentation.

SUMMARY OF THE DISCLOSURE

Before beginning a detailed discussion of the apparatus and system, the disclosed features will be outlined, rather broadly, in order that the detailed description to follow may be better understood, and in order that the disclosed apparatus and system's novel contribution to the art may be better appreciated. There are additional features of the disclosure that will be described hereinafter. The term "device" is occasionally used in this disclosure to abbreviate the rather lengthy term "disclosed system and apparatus."

In this respect, before explaining a first example of the disclosure in detail, it is to be understood that the disclosed system is not limited in its application to the details of construction or to the arrangements of the components set forth in the following description or illustrated in the drawings. The disclosure, in one example, is capable of other applications and of being practiced and carried out in various ways.

The system, in one example, provides a device for aggregating networks in a vehicle, and serving data from those networks to computers for integrating information from various systems in a vehicle, processing that information, and presenting it to consumers of information in a suitable format. In one example, the device uses a highly integrated system on chip to provide computing resources to operate the disclosed apparatus.

To improve connectivity, the device, in one example, includes vehicle bus interface (such as the Scantool STN1110) to interact with the vehicle's data bus. To allow for wireless communication, the device, in one example, includes a WiFi chipset that can operate in WiFi Access Point, WiFi Client or WiFi Direct mode interchangeably. One such chipset providing the desired functionality is the CSR 6031 chipset. Alternatively, the device includes a broadband wireless modem to provide internet connectivity. In one example, the device includes a Bluetooth transceiver and/or a broadband wireless modem. To determine relative movement and/or position of the device, the device may include an accelerometer, gyroscope and/or magnetometer. These components may also be utilized for inertial navigation and three-dimensional (3D) positioning information. In at least one example, the device provides an Ethernet interface for interfacing the aggregated network data to Ethernet-based devices in the vehicle. On one example, the Ethernet or other connective subsystem is utilized to connect the aggregate network to cameras, high speed data busses, or other video peripherals. Such cameras may be utilized, for example, to scan cargo bar codes and quick response (QR) codes.

In order to allow various connectivity peripherals to be easily added to the system, the device in one example provides a MiniPCIe expansion slot.

To maintain a properly functioning aggregate network, it is important that the device has ample RAM and Flash Memory to run common embedded operating system and application software as well as store at least 2 GB of data. It is also important, in many applications, that the device is capable of managing its power consumption. This functionality is important, in some applications, when the vehicle's power gets low, so that the device can sustain itself for days using an internal battery.

It has also proven to be useful, in some applications, to provide a system, wherein the device can switch between WiFi Client and WiFi Access Point mode depending on the context in which it is being operated. Connectivity may also be provided by utilizing a Web Server and WebSockets capable of supporting HTML5/CSS3/JS Web Applications on any HTML5 compatible smart devices. In one example, the device includes an installable service provider software module that embodies the core business logic and presents the user interface for that software through HTML5 or related web technologies for any given owner's use of the device.

In one example, the device has a complete network stack with firewall, dynamic host configuration protocol (DHCP), domain name system (DNS), network address translation (NAT), and routing features.

In some examples, the system has been configured such that the device can report collected data to back end servers via multiple connectivity paths depending on what is available and the (lowest) cost of data transport available to the device to reach the back end server.

Another object is to provide a device for aggregating networks in a vehicle and serving data from those networks to remote computers, wherein the device includes external connectors to interface with the power, vehicle, antennas, networks, and peripherals that can be attached to the box.

In one example, the system may further comprise: a plurality of medical probe and sensor interfaces. Such components may be selected from the group consisting of: ultrasound, temperature sensor, blood pressure sensor, pulse oximeter, glucose sensor, and electrocardiogram (EKG). A software application capable of interpreting and processing the probe or sensor interface data may also be utilized.

The disclosed apparatus may be embodied in the form illustrated in the accompanying drawings, attention being called to the fact, however, that the drawings are illustrative of some examples, and that changes may be made in the specific construction illustrated and described within the scope of this application.

BRIEF DESCRIPTION OF THE DRAWINGS

Various other objects, features and attendant advantages of the disclosure will become fully appreciated as the same becomes better understood when considered in conjunction with the accompanying drawings, in which like reference characters designate the same or similar parts throughout the several views, and wherein.

DESCRIPTION OF THE PREFERRED EMBODIMENTS

A. Overview

Figure 1:
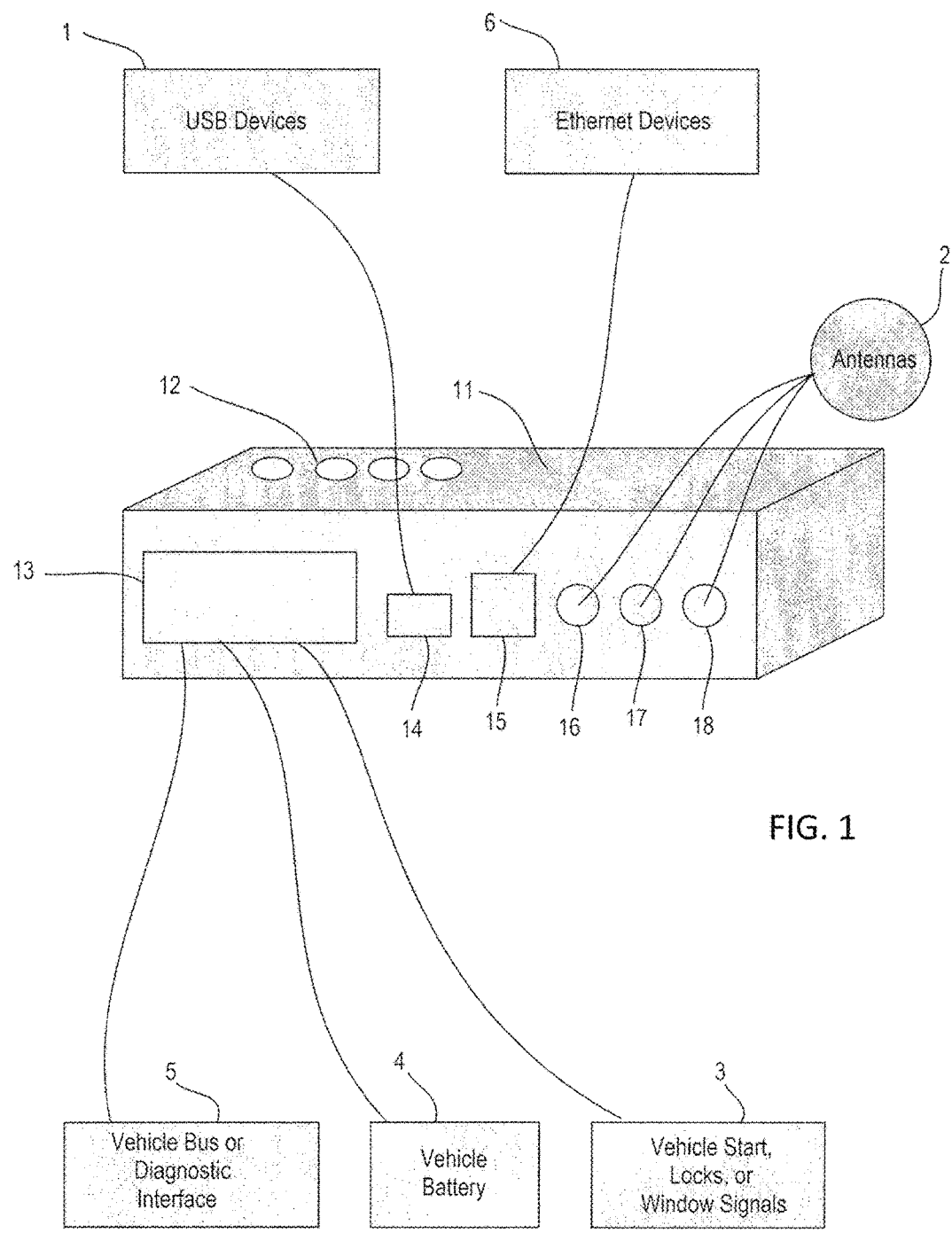
FIG. 1 is a diagrammatic illustration of one example of a vehicle computer system interfaced with multiple external peripherals, networks, and systems.
Figure 2:
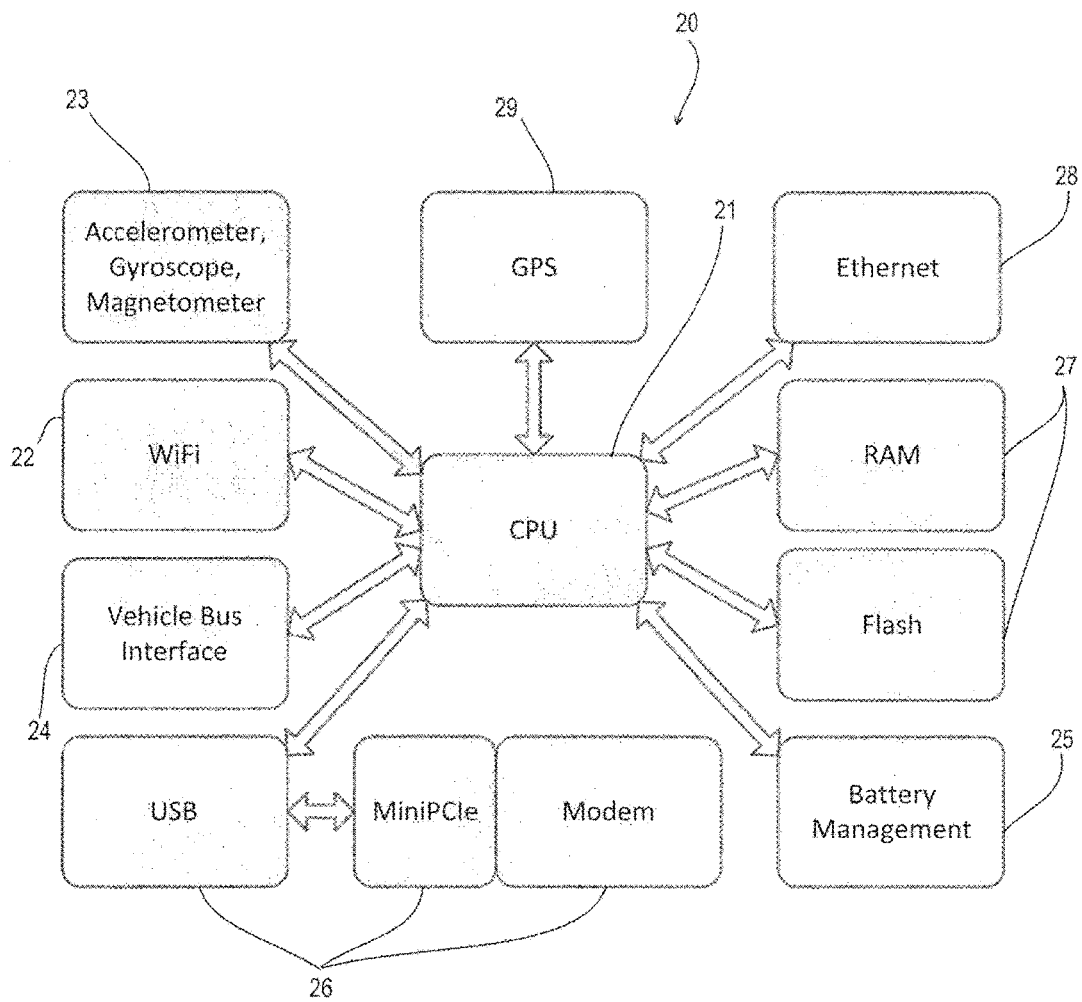
FIG. 2 is a block diagram according to one implementation of the hardware components involved in the disclosed system.

Turning now descriptively to the drawings, in which similar reference characters denote similar elements throughout the several views, the figures illustrate three main components, although other components and variants of these components could also be utilized. The first component, in one example, is a motherboard containing the electronics embodying the vehicle computer system. The second component is software which implements the instructions for the electronics enabling the functionality described herein. The third component, in this example, is a case to protect the motherboard and to provide a method of mounting the device in a vehicle.

B. Enclosure (Case)

In one example of the disclosed system, a case (housing) is provided. The case 11 contains and protects the motherboard and other electronic components. The motherboard, which has software loaded on it, includes circuitry and memory with software. The case 11 protects the motherboard from damage and provides a way for the vehicle computer system to be mounted in the vehicle.

The enclosure provides appropriate containment, protection, mounting and possibly heat dissipation for the motherboard 20 for the in-vehicle computer system. It is sized according to the motherboard 20 and the features included on the motherboard 20. The enclosure contains supports that the motherboard 20 rests on and contains the motherboard 20 securely when the enclosure is fully assembled. The enclosure should be created from material, such as 141 Polycarbonate, that is suitable for the automotive environment.

Protruding from the case 11 are the various connectors the system utilizes for the purpose of integrating with various systems and peripherals in the vehicle. The Vehicle Harness Connector 13 provides a connection point to the vehicle's power supply, diagnostics bus, and to interface with vehicle systems that must be controlled by relay. The universal serial bus (USB) Port 14 is present to allow connection to a personal computer (PC) (e.g., for receiving a software update), or to attach USB peripherals such as a mass storage device or sensors. The Ethernet Port 15 provides a connection to in-vehicle Ethernet devices such as cameras, etc. The Antenna Jack connectors 16, 17, 18 may be utilized for connecting various wireless communications structures (antennas) to the device in the event that the device does not have an antenna built into the motherboard. Status Indicators 12 are provided, in some examples, for diagnosing problems with the device in the event of malfunction of any component of the device or peripherals.

In the event that an Ingress Protection (IP) rated case requiring complete or nearly complete air-tight and moisture-tight features is required, there may not be enough thermal dissipation from the motherboard 20 to the environment. In this event, portions of the case may be made from aluminum or other sufficiently heat conducting material to facilitate thermal conduction. In most examples, it will be desired to utilize a material that is also rugged enough for the environment that the device will be deployed in. A thermal paste or equivalent can be used to thermally bond the central processing unit (CPU) 21 to the Case 11 to dissipate that heat. Heat sinks or equivalents may also be employed.

C. Motherboard

In one example, the motherboard 20 contains all of the electronics necessary for the vehicle computer system to run the software element to perform the functions enumerated herein.

The motherboard contains all of the circuitry for the in-vehicle computer system. At the heart of the motherboard is a System on Chip CPU 21 (such as the CSR Atlas V™). This chip, in one example, provides the interfaces for all of the other chips that make up the system. The Memory 27 may be segmented into both random access memory (RAM) and Flash memory to provide data storage (memory) for system operation, along with storage for software and data. The WiFi System 22 chipset typically connects via secure digital input output (SDIO) (such as the CSR 6031™) and provides WiFi Client, WiFi Access Point and WiFi Direct functionality depending on the mode in which it is operating. This allows the device to serve both as an access point to serve data to devices, as a WiFi client to connect to other WiFi Access Points, or as a peer in a WiFi direct network. The Sensors 23 may include an Accelerometer, Gyroscope, Magnetometer, Battery Voltage Meter, Thermometer, Input Voltage Meter, and General Purpose Input Output Sensor (GPIO's). These sensors are typically connected via Inter Integrated Circuit (I2C) on the CPU 21 or are integrated into the CPU 21. The Battery Management Subsystem 25 controls the charging of an optional battery and, in one example, allows the system to continue running when external power has been removed. The Battery Management Subsystem, in one example, allows for the device to detect and report power loss, and fully operate apart from being attached to vehicle power for as long as the battery is adequately charged. The Vehicle Interface 24, in one example, provides a standard interface for the Society of Automotive Engineers (SAE) On Board Diagnostics (OBD) II and SAE J1939 vehicle bus interface. It also works with standard Controller Area Network (CAN) buses. This interface can be further enhanced to support other serial bus interfaces. The vehicle interface 24 in one example is based on a chip like the OBD Solutions STN1110 or the ELM Electronics ELM327. The chip connects to the CPU (21) via a high speed Universal Asynchronous Receiver/Transmitter (UART). The Global Positioning System Receiver (GPS) 29 is either a discrete module provided by a GPS vendor like uBlox or CSR. The term GPS used herein to indicate a system for receiving an external surface or orbitally originating wireless signal and calculating a position relative to the origin of those same signals. In one example, the CPU 21 provides for a built in GPS (like the CSR Atlas V) and, in this example, the GPS 29 may only be the additional electronics necessary to interface to the antenna. This GPS 29 interfaces to the CPU 21 via a UART or baseband interface. The Ethernet interface 28 provides a method for attaching the motherboard 20 to other Ethernet devices such as a video camera or Institute of Electrical and Electronics Engineers (IEEE) 802.11p radio, or other custom network appliances. In one example, the Ethernet interface connects to the CPU (21) via Secure Digital Input Output (SDIO) or Security Parameter Index (SPI). The Modem Interface 26, in one example, is comprised of three subcomponents including USB, a Miniature Peripheral Component Interconnect (MiniPCIe) connector that is connected to the USB and a modem module that inserts into the MiniPCIe connector. The Modem Interface 26 provides access to wireless networks. Access to wireless networks may include cellular 3G/4G network, Bluetooth Networks, Satellite Networks, or custom radio interfaces on licensed frequencies. The USB component of the Modem Interface 26, in one example, is separately utilized to allow other USB devices to be attached to the motherboard 20.

The design of the motherboard 20 allows various subsystems to not have their parts populated when the motherboard 20 is built. The WiFi System 22, Sensors 23, Vehicle Interface 24, Battery portion of Battery Management 25, the Modem Interface 26, the Ethernet 28 and the GPS 29 can all be depopulated in any permutation and the remaining subsystems will work properly. One notable combination when this depopulation system may be used is when the Modem Interface 26 is populated with a modem that has a built in GPS or Assisted GPS (AGPS). In these cases, a customer may only want to use the GPS on the modem to save the cost and/or complexity of the dedicated GPS 29. A common cost reduced configuration of the Motherboard 20 includes only subcomponents such as CPU 21, WiFi System 22, Vehicle Interface 24, Battery Management 25 (minus the actual battery) and Memory 27.

D. Operating System Software and Device Drivers

The software provides the instructions for the Motherboard to perform the features necessary to enable the software to perform the tasks enumerated in this application.

The core operating system 33 for this design, in one example, is the MICROSOFT WINDOWS CE operating system 6. In other examples, the core operating system may be the QNX operating system, LINUX operating system or ANDROID operating system. At the lowest level of the Operating System Software and Device Drivers 30 is the Hardware Abstraction Layer 31. This Hardware Abstraction Layer 31 contains components for operating the hardware during boot time, during interrupt handling, during lowest power operating modes, and during critical system failures. While this Hardware Abstraction Layer 31 interacts with the operating system, the Hardware Abstraction Layer 31 may not require the operating system in order to perform its functions. The Hardware Abstraction Layer 31, in one example, is a key part of fault tolerance and recovery in the system. In one example, the Hardware Abstraction Layer 31 includes system timekeeping, power management, CPU configuration, event logging and low level diagnostics for post-failure analysis. This Hardware Abstraction Layer 31 also utilizes a formal Application Programming Interface (API), which is exposed to Device Drivers 32 for interrupt handling. Device Drivers 32, in one example of the system, handle all the various devices in the system, including physical devices and virtual devices. In this layer, the driver interfaces for Sensors 23, Vehicle Interface 24, Ethernet 28, and GPS 29 exist. The Power Handler 34, in one example, manages power and battery charging in the system. The Power Handler 34 may also be responsible for determining the current power state of the system and for adjusting the current power state as necessary relative to the power state that the application software 40 may be requesting. The Power Handler 34 may also be responsible for addressing emergent situations such as sudden external power loss, battery failure, and temperature conditions. The Over the Air Update Support 35 operates alongside the components in the Operating System Software and Device Drivers 30 to facilitate the secure download, installation, and rollback of software updates for the in-vehicle computer system and the devices attached to it, such as the Vehicle Interface 24 or the Modem Interface 26. The Over the Air Update Support 35 may be capable of running the Motherboard 20 hardware to facilitate upgrade of the Operating System Software and Device Drivers 30. The Modem Handler 36, in one example, is a software stack for operating various 3G or 4G cellular modems that connect via the Modem Interface 26 to the device. The Modem Handler 36 detects the type of modem installed and configures itself to run in the mode necessary to operate the modem correctly. The WiFi Handler 37, in one example, is a software stack and API that is capable of running the WiFi System 22 in WiFi Client, WiFi Access Point or WiFi Direct mode depending on the requests of the Application Software 40. The WiFi Handler 37 may automatically configure most WiFi parameters requiring that the Application Software 40 only provide a security key and Service Set Identification (SSID) to create a connection.

To support the flexible configuration of the Motherboard 20, the Operating System Software and Device Drivers 30 may provide device detection during initialization. In this example, if a peripheral device (sensor, etc.) is not present, the device driver is not loaded for that peripheral device. If the peripheral device is present, the associated driver is loaded. Additional device drivers 32 could be added to this configuration to support additional devices being supported via USB on the Modem Interface 26 or additional Sensors 23.

E. Application Software

The software utilizes a user interface and may perform the business logic required for any given deployment of the disclosed system and device.

The Application Software 40 may comprise an API layer that provides a structured method for Application Software 40 to access complex data.

The Application Software 40, in one example, also comprises a server layer that collects the data from the API layer. Primarily, this server layer is made up of the WebSockets 44 and the Web Server 45. In one example, the Application Software 40 is provided as a Web Application 46 or a Service Provider Application 47 resident on the motherboard 20 to eliminate the need for software to be installed on the remote computing device.

The Vehicle Bus API 41, in one example, collects data from the Device Drivers 32 which share data with the Vehicle Interface 24 and interprets the data to a format that can be accepted by the Web Sockets 44. The Vehicle Bus API 41 can also accept data from the WebSockets 44, validate the legitimacy of the data, and then communicate the data to the Device Drivers 32, which then gets communicated to the Vehicle Interface 24, such that components on the Vehicle Bus can be controlled through the HTML5 applications. Examples of components which may be controlled in this manner include: vehicle headlamps, door locks, and engine start.

The Sensor API 42, in one example, collects data from the Device Drivers 32 (which exchange data with the Sensors 23) and interprets the data into a form that can be accepted by the WebSockets 44. The Sensor API 42, in one example, can also accept data from the WebSockets 44, validate the legitimacy of the data, and then communicate the interpreted data to the Device Drivers 32. The data may then be communicated to the Sensors 23.

The Location API 48, in one example, collects data from the Device Drivers 32 which communicates with the GPS 29 and interprets the data into a form that can be accepted by the WebSockets 44. The Location API 48 can also take data from the WebSockets 44, validate the legitimacy of the data, and then communicate the interpreted data to the Device Drivers 32. The data may then be communicated to the GPS 29.

The Short Term Data Store 43 is used by the following components: Device Drivers 32, Power Handler 34, Over the Air Update 35, Modem Handler 36, WiFi Handler 37, Vehicle Bus API 41, Sensor API 42, Service Provider Application 47, and Location API 48, to keep a copy of the last reported value of any particular data element. This copy of the last known good value can then be communicated by WebSockets 44 or directly accessed by the Service Provider Application 47.

The WebSockets 44, in one example, are used to publish data to HTML5 Web Applications 46 communicated by the Web Server 45 or to publish data to the Service Provider Application 47. The WebSockets 44 may also be used by HTML5 Web Applications 46 or Service Provider Application 47 to send data to various subsystems, but does not provide uncontrolled access to those subsystems. The WebSocket layer provides data collected by the device in a normalized format using text naming conventions to allow a standardized way to access available data on the device without regard to the data's actual origin. The WebSockets 44 can also provide an input/output path to devices connected to the Modem Interface 26 via the Modem Handler 36, the Ethernet 28 via the Device Drivers 32, or the WiFi System 22 via the WiFi Handler 37. Power Management can also be performed in limited ways with WebSockets 44 through the Power Handler 34.

The Web Server 45 may be a web server that is compliant with internet standards and also supports ISAPI extensions. The Web Server 45 in one form is capable of meeting the requirements for full HTML5/CSS3/JavaScript support for WebApps. The Web Server 45 communicates files to a requestor on the network connected to the Motherboard 20 via WiFi System 22, Ethernet 28 or Modem Interface 26.

The Web Application 46 may be hosted by the Web Server 45. In one form, the Web Application 46 is delivered to the requesting device, typically a (portable) smart device, which is connected via WiFi System 22. This application implements the user interface to the in-vehicle computer system. One or more Web Applications 46 can be present on the system and one or more requesting device(s) can be supported at a time. A very powerful feature of Web Applications is that such Web Applications operate across multiple platforms, which helps eliminate compatibility problems and device version problems.

The Service Provider Application 47 may implement the business logic of the system to provide functionality such as connecting to back end servers, synthesizing or processing data from the various interfaces and then reporting the processed data, logging the processed data, or trigging an event from processed or raw data. A typical example would be for Automatic Vehicle Location system wherein the Service Provider Application 47 would track the location of the vehicle by using the Location API 48, processing that information into a form that a remote server may request, and then reporting the location of the vehicle via the Modem Handler 36 or equivalent subsystem. In one example, the Service Provider Application would repeat location system/routing on a repeating schedule, such as for example every 5 minutes.

In one form, the locating and reporting subsystem may be disabled for example when the vehicle was turned off. In other examples, the reporting subsystem may operate on an interactive schedule such as when the vehicle is not operating, in which case the reporting subsystem would report the vehicle location, for example, every hour.

A number of Web Applications 46 or varying degrees of sophistication of the Service Provider Application 47 can be created. In some examples, more than one Service Provider Application 47 may be present. In addition, the Service Provider Application may be written in a programming language supported by the target operating system. Also, the Service Provider Application can access varying Operating System 33 API's directly instead of using WebSockets 44 if a data element or service not provided by WebSockets 44 is necessary.

Further, smart devices that are connected via WiFi System 22, Ethernet Interface 28 or the Modem Interface 26 may comprise dedicated applications on them that directly use the WebSockets 44 interface without using a Web Application 26.

F. Connections of Main Elements and Sub-Elements of the Disclosed System and Device The Application Software 40 is stored in the Persistent Storage (such as Flash Memory) of the device and hosted by the Operating System Software, Services, and Device Drivers 30. Each of the Application Software, Operating System Software, and Device Drivers are installed on the Motherboard 20 which is inserted in the Case (or Enclosure) 10. A remote computer then accesses the Application Software remotely, and displays an output of the data to the user. The remote computer may also comprise a user input peripheral such as a touch screen, keyboard, mouse etc. for navigating the Application Software, selecting and manipulating the data display, and inputting commands and data.

Figure 3:
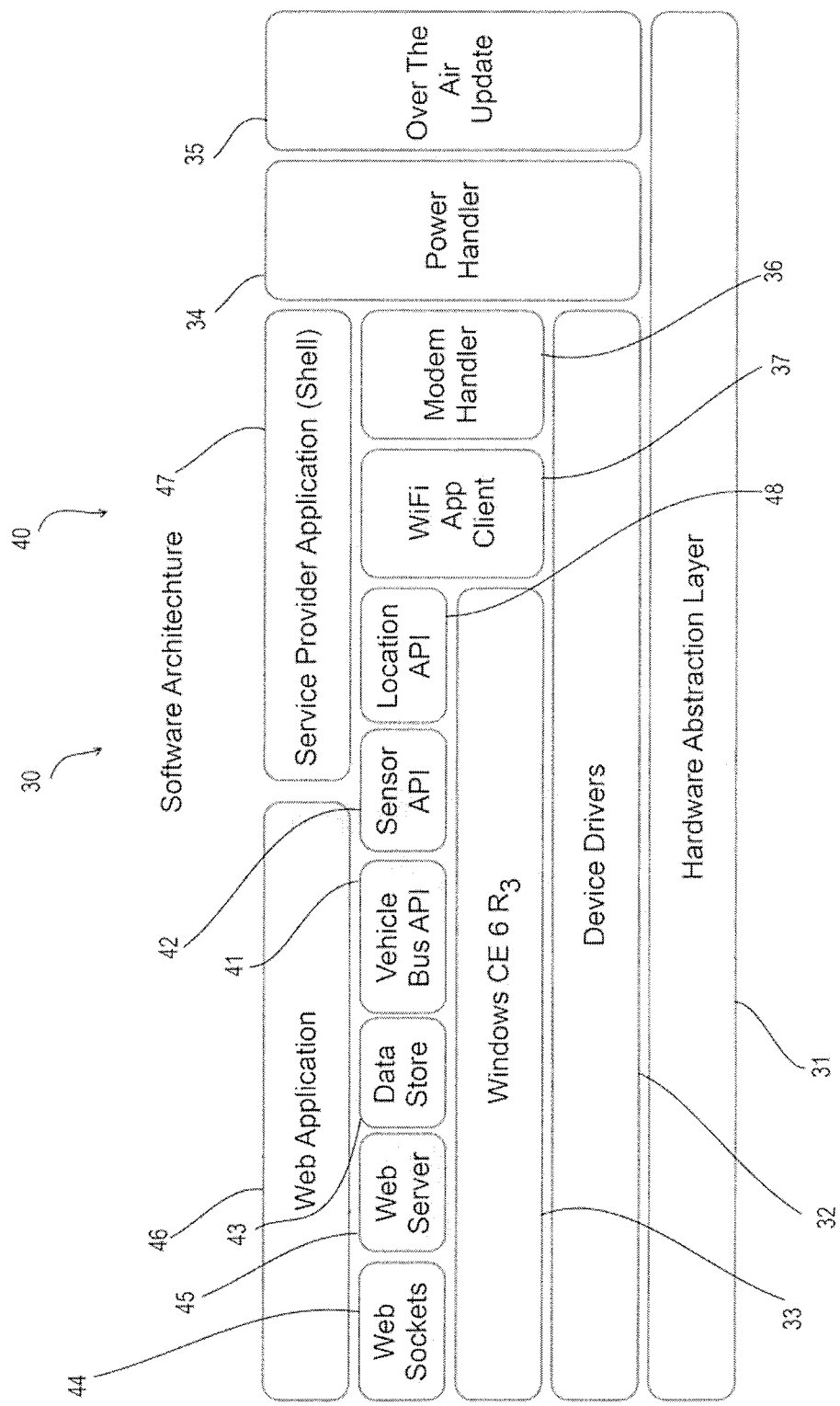
FIG. 3 is a block diagram of vehicle computer system software according to one example of the disclosed system.

Reference is made to FIG. 3, which shows details of how the software of one example is arranged from a logic block perspective. Additionally, reference is made to FIG. 4 to understand how data flows through the various software subsystems to and from the Application Software 40.

G. Alternative Embodiments of the Disclosed System and Device

Possible alternative variants of this disclosed system and device include:

1) A Kiosk connectivity box that provides the CPU 21, Battery Management 25, Modem Interface 26 and Ethernet Subsystem 28 with associated Operating System And Device Drivers 30 with application software necessary to maintain a network connection if faults occur. Each of these components may be conveniently provided in one Enclosure 10.

2) A Vending Machine Connectivity Box that provides the CPU 21, Battery Management 25, Modem Interface 26 and CAN interface from the Vehicle Interface 24 with associated Operating System and Device Drivers 30 and Service Provider Application 47. In this example, the Service Provider Application 47 may provide an internet connection to the vending machine for clearing credit card transactions and may communicate with the vending machines hardware over CAN. Again, each of these components may be conveniently provided in one Enclosure 10.

3) An in-vehicle WiFi Access Point that includes CPU 21, WiFi System 22, Battery Management 25, Modem Interface 26, the Operating System Software and Device Drivers 30 to function as a wireless access point. In one example, all of these components are provided within one convenient Enclosure 10.

4) A medical probe wireless docking station that provides the CPU 21, Battery Management 25, WiFi System 22, and CAN interface from the Vehicle Interface 24 with associated Operating System and Device Drivers 30 and Service Provider Application 47 that allows medical probes to be plugged in to the CAN or USB bus interface and have the probe data processed by the Service Provider Application and made visible through a user interface presented via HTML5 and WebSockets to smart devices that attach via WiFi. This docking station, in one example, communicates securely with the medical data server via WiFi. In one example, patient medical data is stored on the secure medical data server rather than on the smart device.

H. Operation of Preferred Embodiment

Figure 4:
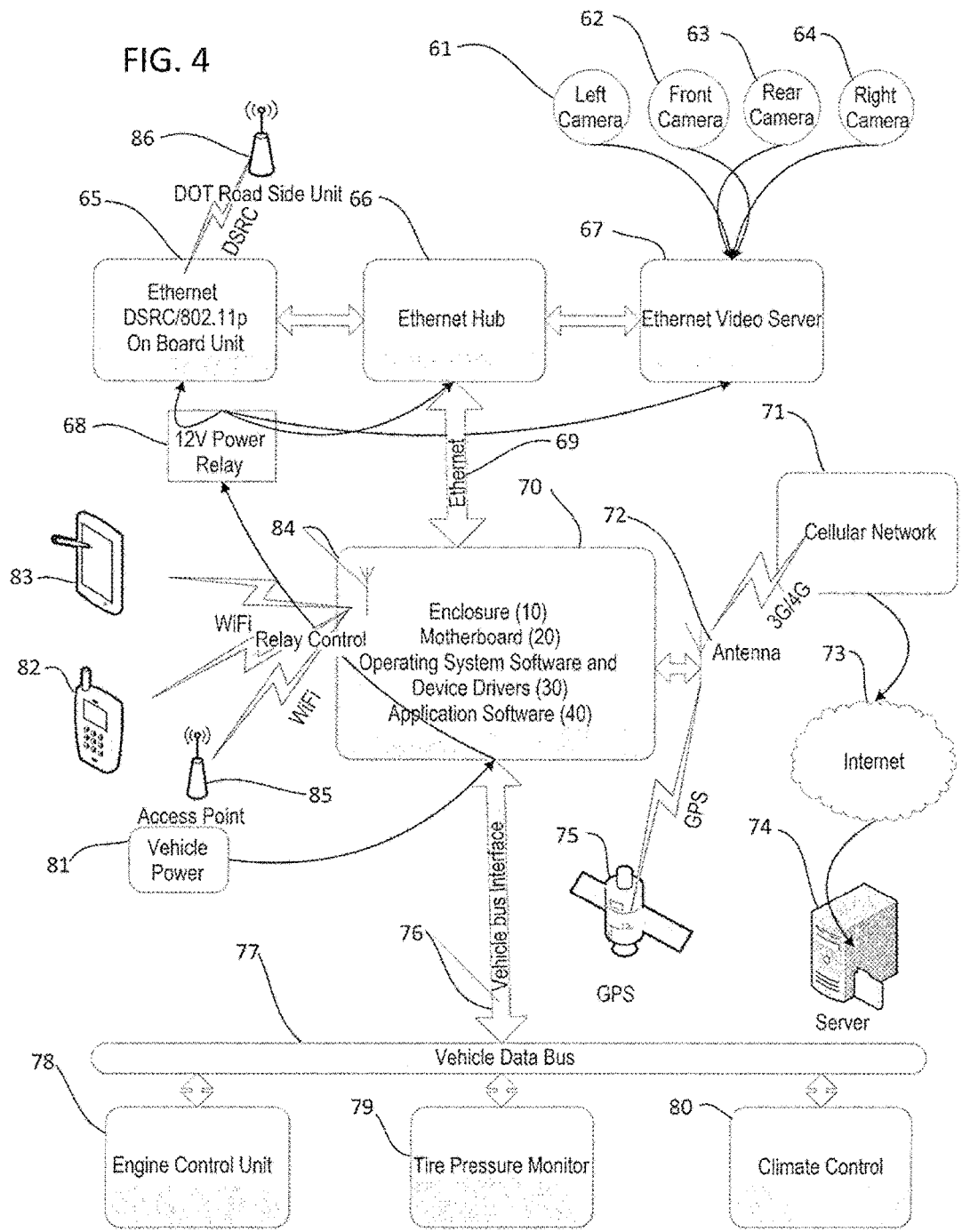
FIG. 4 is a diagram showing one example of the disclosed system.

Reference is made to FIG. 4 for a visual illustration of the operation of the disclosed system and device in one example.

The information hub 70 brings together unrelated systems on the vehicle into a format that can be used for information, entertainment, diagnostics, and control. Each unrelated subsystem is detailed below.

Vehicle Data Bus 77:

Through the vehicle bus interface 76, data is collected from various devices on the vehicle data bus 77 such as the Engine Control Unit 78, the Tire Pressure Monitor 79 and the climate control unit 80. The vehicle bus interface 76, in one example, is connected to the Vehicle Harness Connector 13 to the Vehicle Interface 24. The Vehicle Interface 24 is operated by the Device Drivers 32, which in turn exposes the information from the devices on the Vehicle Data Bus 77 via the Vehicle Bus API 41. The Vehicle Bus API 41 then publishes the information through the Short Term Data Store 43. Here the data is normalized so that the WebSockets 44 can receive and interpret the data. If a remote computing device such as a tablet 83 or smart phone 82 is attached via WiFi System 84 or WiFi System 22 to the information hub 70 and running a Web Application 46, the WebSockets 44 may then provide the information from the Short Term Data Store 43 to the Web Application 46.

Through the Ethernet Interface 28 and Ethernet Network, one or more Ethernet devices (65, 66, and 67) may be connected to the Information Hub 70. In this embodiment, a Dedicated Short Range Communication Unit 65 supporting 802.11p is connected to an Ethernet hub 66. Also, an Ethernet video server 67 may be connected to the Ethernet hub 66. Several cameras may be connected to the Ethernet hub 66 via the Ethernet Video Server 67 such as for example: Left Rear View Camera 61, Front View Camera 62, Rear Facing Camera 63, and Right Rear View Camera 64.

The DSRC/802.11p unit 65 (or equivalent) routes specialized data to and from other vehicles and Department of Transportation Road Side Unit 86. In one example, the traffic data is communicated by in the Service Provider Application 47 or Web Application 46 on a Computing device such as smart phone 82 or tablet 83. In one example, the DSRC/802.11p unit 65 or equivalent can route regular network traffic such as Web Applications 46 from the Information Hub 70, through the Ethernet Interface 28, which is handled by the network device drivers 32 and passed to other devices communicating with the DSRC/802.11p unit 65.

The Ethernet video server 67, in one example, streams (communicates) video over the Ethernet to the Information Hub 70 through the Ethernet Hub 66. This video stream may then be received up by the Device Drivers 32. The Device Drivers 32 operate the network, and the video stream may then be routed to any Web Application 46 that is requesting the video stream. An alternate example would be to integrate the video server 67 onto the motherboard 20 for direct video connection to the device.

The modem handler 36, in one example, shares the modem interface 26 connection to the 3G/4G 72 network or equivalent, via the Modem Antenna Jack 18, with any Application Software 40 wishing to send data outside the internal network of the Information Hub 70. The Modem Handler 36 also allows network traffic from the WiFi System 22 or Ethernet Network 28 to be sent out the Modem Interface 26 using Network Address Translation technology in the Core Operating System 33. Through the Modem Interface 26, data can be sent to the cellular network 71 then, if desired, to the Internet 73 and, finally, to an off-board server 74. The Information Hub 70, on behalf of the Service Provider Application 47 or a Web Application 46, in one example, can also query an Off-Board Server 74 to query instructions for actions that the application software 40 should follow. Communications between the Information Hub 70 and Off-Board Server 74 may include Over the Air Update Support 35 as well. Lastly, Web Applications 46 may be accessed remotely over the Internet 73 through the Cellular Network 71, through the Modem Interface 26, through the Modem Handler 36, to the Device Drivers 33, to the Web Server 45. In one example, the Modem Interface 26 may also have GPS information programmed thereon via AGPS or some other mechanism. This global position information, in one example, can be communicated via the Location API 48 or by using the GPS built into the motherboard 29.

The WiFi System 22 in one example works in three different modes or in a combination thereof:

In Access Point mode, WiFi Access Point 22 serves as a wireless access point for any WiFi compliant device to attach to such as tablets 83 and smart phones 82. This mode provides the attached devices with access to the Web Applications 46, the Internet 73, or devices on the Ethernet 28, for example, the Dedicated Short-Range Communications (DSRC) 65 or Ethernet Video Server 67. This Access Point Mode also allows devices to access other devices attached to WiFi.

In Client Mode, the WiFi System 22 connects to nearby Access Points 85 to which the WiFi System 22 is authorized to be connected. This client Mode allows the Service Provider Application 47 to upload and download information (data) over a WiFi System 22 or may also provide a connection to the Internet 73 through the Access Point 85. This system, in one example, would be ideal for a fleet yard, where vehicles were parked, allowing them to cost-effectively communicate information collected and to download software updates, for example, via Over The Air Update Support 35.

In WiFi Direct Mode, the WiFi system 22 can provide wireless access point functions for a WiFi Direct compliant device such as a tablet 83 while also connecting to and sharing data with other WiFi devices such as WiFi Displays, WiFi Speakers or other WiFi Access Points 85.

Devices connected to the WiFi system 22, in one example, can route network traffic across Ethernet 28 connected devices and Modem Interface 26 connected systems. WiFi system 22, in one example, utilizes radio signals sent through the WiFi Antenna Jack 17 or an integrated antenna in WiFi 22.

The GPS 29 subsystem, in one example, reports information through the Device Drivers 32 and up to the Location API 48. The GPS data in one example is then normalized and posted to the Short Term Data Store 43 where the normalized data is provided to WebSockets 44 and ultimately accepted by either a Web Application 46 or Service Provider Application 47. GPS 29 receives GPS data through GPS Antenna Jack 16.

The Sensors interface collects a number of different types of sensors 23 together under a single interface, the Sensor API 42. These sensors include an Accelerometer, Gyroscope, Magnetometer, Battery Voltage, Input Voltage, Internal Temperature, Battery Temperature, General Purpose Output, General Purpose Input. This information can be used to determine what is going on with the vehicle from an inertial standpoint. It can also be used to determine if the operating conditions are within specification or not. Systems or mechanisms may also be provided for user direct input, so as to log health, sleep, stops, fueling, etc. such as by way of a touchscreen, keyboard, mouse, or other user input terminal.

This information is utilized via WebSockets 46 and the Service Provider Application 47.

The Power Handler 34 interface allows for detailed control of the power usage of the device. In one example, each major block of the Motherboard 20 can be powered on, off, and variants thereof using this Power Handler 34 interface. Power conditions, in one example, are communicated to the Power Handler 34 using the Short Term Data Store 43 and made available via WebSockets 44 or through the Operating System 33 API's directly.

In the disclosed system and device described herein several scenarios can take place including, but not limited to:

A remote and portable computing device, such as a tablet 83 or smart phone 82, may be connected via WiFi System 84 or WiFi system 22 to, for example, the Information Hub 70. The portable computing devices, in one example, access the Web Server 45, which then communicates a Web Application 46 to the remote computing device. The Web Application 46 then displays instrumentation for the vehicle on a display screen of the remote computing device. The Web Application 46 communicates with the WebSockets 44 to retrieve data for instrumentation and communicate this data to the display screen. The WebSockets, in one example, queries the Short Term Data Store 43 which keeps the last reported values of the data to be used for the instrumentation. The Vehicle Interface 24, in one example, receives data from the Vehicle Data Bus 77, passes the data to the Device Drivers 32, which then passes the data to the Vehicle Bus API 41 for processing (decomposition). The data may then be reported to the Short Term Data Store 43 to be communicated to the WebSockets 44 when the value is requested. The Service Provider Application 47 may be configured to detect a diagnostic trouble code communicated by the Vehicle Bus API 41 and may, upon such detection, generate a report (alert) to send to a fleet management server. The report may be routed through the Network Device Drivers 32, through to the Modem Handler 36, through the cellular network 71, to the Internet 73 and further communicated to the fleet server 74. The fleet server 74 may request information regarding the vehicle (global) position and inertial data (movement). The Service Provider Application 47 may also be configured to call the Location API 48 and Sensor API 42 to collect the required information (data). The information is then communicated, in one example, via the Modem Interface 26 to the server 74.

In one example, when the vehicle enters the fleet yard and it is turned off, the Service Provider Application 47 may be configured to sense the need to turn off the information hub and may call the Power Handler to turn off, at least, a portion of the information hub 70. The Service Provider Application 47 may then signal the relay 68 to turn off the power to one or more of the devices on the Ethernet 69, which may include the DSRC/802.11p 65 chip, Ethernet Hub 66 and/or Ethernet Video Server 67. The WiFi System 22 may then be switched from Access Point Mode to Client Mode and it connects to the Access Point 85 in the fleet depot area.

Complete diagnostic information may be collected using the Vehicle Bus API 41 by the Service Provider Application 47 and sent to the server 74 via the WiFi system 22 Access Point 85 connection. The unit then fully powers off via the Power Handler 34.

Vehicle component control information can be requested by the HTML5 application via WebSockets. The WebSockets may then request the Service Provider Application 47 to send control codes across the Vehicle Bus API 41 to interact with components in the vehicle such as door locks, compartment or driving lights or engine control (ignition). Alternatively, the Service Provider Application 47 may send control codes across the Ethernet or WiFi to other devices to control these or equivalent components.

In at least one example, vehicle data and medical data may be received and aggregated by a single device or system. Such a combination has particular application to ambulances, not only ground, but air and water as well, where vehicle data and patient data may be collected.

While the present invention is illustrated by description of several examples and while the illustrative examples are described in detail, it is not the intention of the applicants to restrict or in any way limit the scope of the appended claims to such detail. Also, it is to be understood that the phraseology and terminology employed herein are for the purpose of the description and should not be regarded as limiting the appended claims. Additional advantages and modifications within the scope of the appended claims will readily appear to those sufficed in the art. The disclosure in its broader aspects is therefore not limited to the specific details, representative apparatuses and methods, and illustrative examples shown and described. Accordingly, departures may be made from such details without departing from the spirit or scope of applicants' general concept.

What is claimed is:

1. A system for aggregating vehicle data and serving the data to a smart device, comprising:

a housing mounted in a vehicle, the housing having connectors configured to electrically connect an interior of the housing to an exterior of the housing;

a plurality of sensors in the vehicle, the sensors being operable to output data relating to sensed conditions of the vehicle, the sensors including a global positioning satellite (GPS) locating system, an accelerometer, and a video camera;

a motherboard mounted in the housing, the motherboard including a processor configured to execute application programs, the motherboard including a memory in which is stored an operating system for execution by the processor, the motherboard including input terminals connected to the connectors of the housing, the input terminals being configured to receive the data from the plurality of sensors, the processor being operable to receive the sensor data and to normalize the sensor data including GPS data and accelerometer data and video data for display on a user interface, the processor being operable to apply a normalized text naming convention to the sensor data, the processor being operable to provide a web server and WebSockets that are operable to publish the normalized data of the sensors to a requesting web application;

the processor being thermally bonded to the housing to dissipate heat generated by the processor to the housing;

a Wi-Fi system mounted on the motherboard and configured to wirelessly connect the processor to a tablet computer or smartphone;

the memory including an installable service provider module that is configured for output from the motherboard to the tablet computer or smartphone outside of the housing, the installable service provider module including a web application configured for delivery to and execution on a tablet computer or smartphone, the web application being executable on the tablet computer or smartphone to request data from the web server and to display a user interface to the user of the tablet computer or smartphone after the web application is transferred from the memory and while the web application is operating on the tablet computer or smartphone, the web application being configured to receive the normalized data published by the web server and WebSockets including the GPS data and the accelerometer data and the video data and to display the normalized data as instrumentation for the vehicle on the tablet computer or smartphone without requiring installation of a user interface program for display of the normalized data from the processor as vehicle instrumentation on the tablet computer or smart phone prior to transfer of the installable service provider module and web application from the motherboard; and a short term data store on the motherboard, the short term data store being configured to keep a copy of a last reported value for the sensor data, the last reported values stored in the short term data store being provided via the WebSockets to the tablet computer or smartphone, the short term data store receiving the sensor data for normalization by the processor and for output by the WebSockets.

2. The system as claimed in claim 1, wherein the web application stored in the memory and configured for transfer to and execution in the tablet computer or smartphone includes an hypertext mark-up language application with cascading style sheets (CSS) and JavaScript.

3. The system as claimed in claim 2, wherein the hypertext mark-up language application with cascading style sheets and JavaScript that is stored in memory and configured for transfer to and execution in the tablet computer or smartphone is an HTML5 web application using cascading style sheets (CSS3) and JavaScript (JS).

4. The system as claimed in claim 1, wherein the Wi-Fi system is operable to connect to an authorized access point and to upload the sensor data through the access point.

5. A system for aggregating vehicle data and serving the data to a smart device, comprising:

a housing mounted in a vehicle, the housing having connectors configured to electrically connect an interior of the housing to an exterior of the housing, the housing being configured as a water-tight housing;

a plurality of sensors in the vehicle, the sensors being operable to output data relating to sensed conditions of the vehicle, the sensors including a global positioning satellite (GPS) locating system, an accelerometer, and a video camera;

a motherboard mounted in the housing, the motherboard including a processor configured to execute application programs, the motherboard including a memory in which is stored an operating system for execution by the processor, the motherboard including input terminals connected to the connectors of the housing and configured to receive the data from the plurality of sensors, the processor being operable to receive the sensor data and to normalize the sensor data including GPS data and accelerometer data and video data for display on a user interface, the processor being operable to apply a normalized text naming convention to the sensor data, the processor being operable to provide a web server and WebSockets that are operable to publish the normalized data of the sensors to a requesting web application;

a Wi-Fi system mounted on the motherboard and configured to wirelessly connect the processor to a tablet computer or smartphone;

the memory including an installable service provider module that is configured for output from the motherboard to the tablet computer or smartphone outside of the housing, the installable service provider module including a web application configured for delivery to and installation on a tablet computer or smartphone, the web application being executable on the tablet computer or smartphone to request data from the web server and to display a user interface to the user of the tablet computer or smartphone after the web application is transferred from the memory and while the web application is operating on the tablet computer or smartphone, the web application being configured to receive the normalized data published by the web server and WebSockets including the GPS data and the accelerometer data and the video data and to display the normalized data as vehicle instrumentation on the tablet computer or smartphone without requiring installation of a user interface program for display of the normalized data from the processor as vehicle instrumentation on the tablet computer or smart phone prior to transfer of the installable service provider module and web application from the motherboard; and a short term data store on the motherboard, the short term data store being configured to keep a copy of a last reported value for the sensor data, the last reported values stored in the short term data store being provided via the WebSockets to the tablet computer or smartphone, the short term data store receiving the sensor data for normalization by the processor and for output by the WebSockets.

6. A system for aggregating vehicle data and serving the data to a smart device, comprising:

a housing mounted in a vehicle, the housing having connectors configured to electrically connect an interior of the housing to an exterior of the housing, the housing being configured as a water-tight housing;

a plurality of sensors in the vehicle, the sensors being operable to output data relating to sensed conditions of the vehicle, the sensors including a video camera;

a motherboard mounted in the housing, the motherboard including a processor configured to execute application programs, the motherboard including a memory in which is stored an operating system for execution by the processor, the motherboard including input terminals connected to the connectors of the housing and configured to receive the data from the plurality of sensors, the processor being operable to receive the sensor data and to normalize the sensor data including video data for display on a user interface, the processor being operable to apply a normalized text naming convention to the sensor data, the processor being operable to provide a web server and WebSockets that are operable to publish the normalized data of the sensors to a requesting web application;

a communication system mounted on the motherboard and configured to connect the processor to a tablet computer or smartphone; and the memory including an installable service provider module that is configured for output from the motherboard to the tablet computer or smartphone outside of the housing, the installable service provider module including a web application configured for delivery to and installation on a tablet computer or smartphone, the web application being executable on the tablet computer or smartphone to request data from the web server and to display a user interface to the user of the tablet computer or smartphone after the web application is transferred from the memory and while the web application is operating on the tablet computer or smartphone, the web application being configured to receive the normalized data published by the web server and WebSockets including the video data and to display the normalized data on the tablet computer or smartphone as instrumentation for the vehicle without requiring installation of a user interface program for the display of the normalized data from the processor as vehicle instrumentation on the tablet computer or smart phone prior to transfer of the installable service provider module and web application from the motherboard.

* * * * *